(12) United States Patent
Hottel et al.

(10) Patent No.: US 9,737,065 B1
(45) Date of Patent: Aug. 22, 2017

(54) BED BUG STICKY TRAP WITH SPECIFIC TEXTURED SURFACE

(71) Applicant: University of Florida Research Foundation, Inc., Gainesville, FL (US)

(72) Inventors: Benjamin A. Hottel, Gainesville, FL (US); Roberto M. Pereira, Gainesville, FL (US); Philip G. Koehler, Gainesville, FL (US)

(73) Assignee: University of Florida Research Foundation, Inc., Gainsville, FL (US)

( * ) Notice: Subject to any disclaimer, the term of this patent is extended or adjusted under 35 U.S.C. 154(b) by 170 days.

(21) Appl. No.: 14/542,137

(22) Filed: Nov. 14, 2014

Related U.S. Application Data

(60) Provisional application No. 62/025,797, filed on Jul. 17, 2014.

(51) Int. Cl.
*A01M 1/14* (2006.01)
*A01M 1/10* (2006.01)

(52) U.S. Cl.
CPC .............. *A01M 1/14* (2013.01); *A01M 1/103* (2013.01)

(58) Field of Classification Search
CPC .......... A01M 1/00; A01M 1/02; A01M 1/023; A01M 1/10; A01M 1/103; A01M 1/14
USPC ............................................ 43/123, 114, 121
See application file for complete search history.

(56) References Cited

U.S. PATENT DOCUMENTS

| | | | | |
|---|---|---|---|---|
| 125,326 A * | 4/1872 | Peck | ....................... | A01M 1/14 43/114 |
| 278,294 A * | 5/1883 | Thum | ...................... | A01M 1/14 43/114 |
| 391,014 A * | 10/1888 | Bosse | ...................... | A01M 1/14 43/114 |
| 414,606 A * | 11/1889 | Thum | ...................... | A01M 1/14 43/114 |
| 431,537 A * | 7/1890 | Trenner | .................. | A01M 1/14 43/114 |
| 466,637 A * | 1/1892 | Thum | ...................... | A01M 1/16 43/114 |
| RE11,276 E * | 10/1892 | Thum | ............................. | 43/114 |

(Continued)

FOREIGN PATENT DOCUMENTS

| CA | 2783685 | 5/2013 |
|---|---|---|
| CA | 2614279 | 3/2014 |

(Continued)

OTHER PUBLICATIONS

Boase, C. (2001) Bedbugs—Back from the Brink. Pesticide Outlook, 12, 159-162.

(Continued)

*Primary Examiner* — Darren W Ark
(74) *Attorney, Agent, or Firm* — Brian S. Steinberger; Law Offices of Brian S. Steinberger, P.A.

(57) ABSTRACT

Traps, devices, systems, compositions, and methods for trapping bed bugs, and similar insects with sticky traps having a smooth perimeter surface around the sticky surface, where the smooth perimeter surface can be abraded to a selected texture having both smoothness and roughness qualities. The surfaces are textured so that bed bugs are not able to use the surfaces to pull themselves from the sticky surface, and the textured surface is not so smooth as to cause the bed bugs to avoid the textured surface.

14 Claims, 8 Drawing Sheets

(56) References Cited

U.S. PATENT DOCUMENTS

| | | | | |
|---|---|---|---|---|
| 486,138 A * | 11/1892 | Thum | A01M 1/14 | 43/114 |
| 510,727 A * | 12/1893 | Thum | A01M 1/14 | 43/114 |
| 534,457 A * | 2/1895 | Thum | A01M 1/14 | 43/114 |
| 800,354 A * | 9/1905 | Boyd | A01M 1/14 | 43/114 |
| 1,655,128 A * | 1/1928 | Berghorn | A01M 1/14 | 43/114 |
| 1,972,762 A * | 9/1934 | Drummond | A01M 1/14 | 43/114 |
| 2,156,380 A * | 5/1939 | Gurley | C09J 7/0246 | 428/351 |
| 2,167,978 A * | 8/1939 | Jennerich | A01M 1/2005 | 43/121 |
| 2,177,627 A * | 10/1939 | Gurley | C09J 7/0207 | 428/352 |
| 2,251,273 A * | 8/1941 | Gurley | C09J 7/045 | 428/496 |
| 2,264,875 A * | 12/1941 | Greuling | A01M 1/16 | 43/114 |
| 2,911,756 A * | 11/1959 | Geary | A01M 1/02 | 43/114 |
| 2,962,836 A * | 12/1960 | Hughes | A01M 25/004 | 43/114 |
| 3,864,866 A * | 2/1975 | Kosinsky | A01M 23/005 | 43/114 |
| 3,913,259 A * | 10/1975 | Nishimura | A01M 1/02 | 43/114 |
| 3,940,874 A * | 3/1976 | Katsuda | A01M 1/14 | 43/114 |
| 4,168,591 A * | 9/1979 | Shaw | A01M 1/023 | 43/114 |
| D260,418 S * | 8/1981 | Baker | D22/119 | |
| 4,395,842 A * | 8/1983 | Margulies | A01M 1/02 | 43/114 |
| 4,424,642 A * | 1/1984 | Stubler | A01M 1/14 | 43/114 |
| 4,438,584 A * | 3/1984 | Baker | A01M 23/005 | 43/114 |
| 4,698,934 A * | 10/1987 | Gonzalez | A01M 1/10 | 43/121 |
| 4,709,503 A * | 12/1987 | McQueen | A01M 1/14 | 43/114 |
| 4,800,671 A * | 1/1989 | Olson | A01M 1/18 | 43/114 |
| 4,815,231 A * | 3/1989 | McQueen | A01M 1/14 | 43/114 |
| 4,862,638 A * | 9/1989 | Stevenson | A01M 1/14 | 43/114 |
| 4,867,731 A * | 9/1989 | Willard | A01K 51/00 | 43/114 |
| 5,231,790 A * | 8/1993 | Dryden | A01M 1/145 | 43/114 |
| 5,303,501 A * | 4/1994 | Seemann | A01M 1/026 | 43/114 |
| 5,394,640 A * | 3/1995 | Musket | A01M 1/14 | 43/114 |
| 5,438,792 A * | 8/1995 | Monett | A01M 1/14 | 43/114 |
| 5,572,825 A * | 11/1996 | Gehret | A01M 1/02 | 43/114 |
| 6,442,889 B1 * | 9/2002 | Lee | A01M 1/14 | 43/114 |
| 6,862,839 B2 * | 3/2005 | Watanabe | A01M 1/026 | 43/114 |
| 6,966,142 B1 * | 11/2005 | Hogsette | A01M 1/2005 | 43/114 |
| 7,469,499 B2 * | 12/2008 | Nelson | A01M 1/145 | 43/114 |
| 7,856,752 B1 * | 12/2010 | Eilersen | A01M 1/14 | 43/114 |
| 8,104,223 B1 * | 1/2012 | Rodriguez | A01M 1/14 | 43/114 |
| 8,316,578 B2 * | 11/2012 | Faham | A01M 1/023 | 43/123 |
| 8,402,690 B2 * | 3/2013 | Schneidmiller | A01M 1/103 | 43/123 |
| 8,413,370 B2 * | 4/2013 | Messian | A01M 1/14 | 43/114 |
| 8,635,807 B2 * | 1/2014 | Frisch | A01M 1/023 | 43/114 |
| 8,661,728 B2 * | 3/2014 | Borth | G01N 33/68 | 43/132.1 |
| 8,789,309 B2 * | 7/2014 | Fabry | A01M 1/026 | 43/123 |
| 8,800,198 B2 * | 8/2014 | Frisch | A01M 1/145 | 43/114 |
| 8,850,741 B2 * | 10/2014 | Hickman | A01M 1/2011 | 43/131 |
| 8,966,812 B2 * | 3/2015 | McKnight | A01M 1/023 | 43/123 |
| 9,179,662 B1 * | 11/2015 | Kort | A01M 1/02 | |
| 9,226,488 B2 * | 1/2016 | Schumacher | A01M 1/14 | |
| 2004/0020104 A1 * | 2/2004 | Feldhege | A01M 1/02 | 43/114 |
| 2009/0145019 A1 * | 6/2009 | Nolen | A01M 1/023 | 43/123 |
| 2009/0223115 A1 * | 9/2009 | Lang | A01M 1/023 | 43/123 |
| 2010/0212213 A1 * | 8/2010 | Hope, III | A01M 1/026 | 43/123 |
| 2011/0047860 A1 * | 3/2011 | Black | A01M 1/02 | 43/123 |
| 2011/0225873 A1 * | 9/2011 | McKnight | A01M 1/026 | 43/123 |
| 2011/0289824 A1 * | 12/2011 | Wu | A01N 33/24 | 43/132.1 |
| 2012/0110894 A1 * | 5/2012 | Black | A01M 1/103 | 43/123 |
| 2012/0151823 A1 * | 6/2012 | Donoho | A01M 1/023 | 43/123 |
| 2012/0167309 A1 * | 7/2012 | Heidorn | A01M 1/103 | 43/123 |
| 2012/0204477 A1 * | 8/2012 | Fairleigh | A01M 1/103 | 43/121 |
| 2012/0210628 A1 * | 8/2012 | Park | A01M 1/14 | 43/114 |
| 2012/0227312 A1 * | 9/2012 | Fairleigh | A01M 1/103 | 43/58 |
| 2012/0227313 A1 * | 9/2012 | Mozeika, III | A01M 1/2011 | 43/121 |
| 2012/0285076 A1 * | 11/2012 | Banfield | A01M 1/026 | 43/123 |
| 2012/0291336 A1 * | 11/2012 | Friend | A01M 1/14 | 43/123 |
| 2012/0291337 A1 * | 11/2012 | Curcio | A01M 1/14 | 43/123 |
| 2013/0111802 A1 * | 5/2013 | Oehlschlager | A01M 1/10 | 43/114 |
| 2013/0180161 A1 * | 7/2013 | Vasudeva | A01M 1/103 | 43/123 |
| 2013/0219771 A1 * | 8/2013 | Black | A01M 1/02 | 43/123 |
| 2013/0312313 A1 * | 11/2013 | Lefkowitz | A01M 1/02 | 43/114 |
| 2013/0318861 A1 * | 12/2013 | Roeder | A01M 1/103 | 43/123 |
| 2014/0290123 A1 * | 10/2014 | Duff | A01M 1/02 | 43/114 |
| 2015/0007485 A1 * | 1/2015 | Hortel | A01M 1/023 | 43/114 |
| 2015/0237842 A1 * | 8/2015 | Thuis | A01M 1/103 | 43/123 |

(56) References Cited

U.S. PATENT DOCUMENTS

| | | | |
|---|---|---|---|
| 2016/0100567 A1* | 4/2016 | McKnight | A01M 1/026 43/123 |
| 2016/0198692 A1* | 7/2016 | Simpson | A01M 1/14 43/114 |
| 2016/0262366 A1* | 9/2016 | Rola | A01M 1/14 |

FOREIGN PATENT DOCUMENTS

| | | | | |
|---|---|---|---|---|
| FR | WO 2010043995 A1 * | 4/2010 | | A01M 1/14 |
| GB | 2463953 A * | 4/2010 | | A01M 1/026 |
| JP | 01138285 A * | 5/1989 | | |

OTHER PUBLICATIONS

Cooper, R. (2006) Bed Bugs—Still More Questions Than Answers: A need for Research and Public Awareness. Entomologist, 52, 111-112. American.

Kaakeh, W. & Benneti, G.W. (1997) Evaluation of Trapping and Vacuuming Compared with Low-Impact Insecticide Tactics for Managing German Cockroaches in Residences. Journal of Economic Entomology, 90, 976-982.

Kardatzke, J.T., Rhoderick, I.E. & Nelson, J.H. (1981) How roach surveillance saves time, material, and labor. Pest Control, 46-48.

Obeng-Ofori, D. (1993) Obeng-Ofori 1993 The behaviour of 9 stored product beetles at pitfall trap arenas and their capture in millet.pdf. Entomologia Experimentalis et Applicata, 66, 161-169.

Phillips, A.D.G. & Wyatt, T.D. (1992) Beyond origami: using behavioural observations as a strategy to improve trap design. Entomol. Exp. Appl., 62, 67-74.

Potter, M.F. (2005) A bed bug state of mind: emerging issues in bed bug management. Pest Control Technology, 33, 82-85, 88, 90, 92-93, 96-97.

Vetter, R.S. & Barger, D.K. (2002) An Infestation of 2,055 Brown Recluse Spiders (*Araneae: sicariidae*) and No Envenomations in a Kansas Home: Implications for Bite Diagnoses in Nonendemic Areas. Journal of Medical Entomology, 39, 948-951.

Wang, C., Gibb, T. & Bennett, G.W. (2009) Evaluation of Two Least Toxic Integrated Pest Management Programs for Managing Bed Bugs (*Heteroptera: cimicidae*) With Discussion of a Bed Bug Intercepting Device. Journal of Medical Entomology, 46, 566-571.

Wang, C. & Bennett, G.W. (2006) Comparison of Cockroach Traps and Attractants for Monitoring German Cockroaches (*Dictyoptera: blattellidae*). Environmental Entomology, 35, 765-770, abstract only.

Wang, C., Tsai, W.-T, Cooper, R. & White, J. (2011) Effectiveness of Bed Bug Monitors for Detecting and Trapping Bed Bugs in Apartments. Journal of Economic Entomology, 104, 274-278.

Ballard, J.B. & Gold, R.E. (1984) Laboratory and field evaluations of German cockroach (*Orthoptera: blattellidae*) traps. Journal of economic entomology, 77, 661-665.

Barak, A.V., Shinkle, M. & Burkholder, W.E. (1977) Using Attractant Traps to Help Detect and Control Cockroaches. Pest Control, 14-20.

Potter, M.F. (2011) The History of Bed Bug Management—With Lessons from the Past. American Entomologist, 57, 14-25.

* cited by examiner

BED BUG STICKY TRAP WITH SPECIFIC TEXTURED SURFACE

This application claims the benefit of priority to U.S. Provisional Patent Application Ser. No. 62/025,797 filed Jul. 17, 2014, which is incorporated by reference in its' entirety.

FIELD OF INVENTION

This invention relates to bed bugs, and in particular to traps, devices, systems, compositions, and methods for trapping bed bugs, and similar insects with sticky traps having a smooth perimeter surface around the sticky surface, where the smooth perimeter surface can be abraded to a selected texture having both smoothness and roughness qualities.

BACKGROUND AND PRIOR ART

Sticky traps have become popular for trapping crawling insects, such as cockroaches and the like. However, traditional sticky traps have problems in trapping bed bugs. For example, research has shown that when a bed bug approaches a sticky trap, the bed bug touches one part of the sticky trap and is able to use their other legs which are not on the sticky trap enough leverage to pull the trapped leg(s) from the sticky traps.

The use of transparent paper such as acetate paper, surrounding a sticky trap may be smooth enough to reduce the leverage factor to prevent the bed bug from pulling themselves off the trap. However, test data has shown that using too smooth of a surface causes a behavior problem where the bed bug actually avoids traveling on the smooth.

For example, U.S. Pat. No. 5,572,825 to Gehret, which is incorporated by reference, describes a glue trap having a slippery surface about the perimeter that does not allow for the cockroach to have enough leverage to remove themselves from the sticky trap. The problem is that the "silicone coated . . . paper . . . " referenced in this patent has been demonstrated to cause bed bugs to avoid the surface as a travel surface. The too slippery surface causes a behavior effect in the bed bugs to avoid contact with very slippery surfaces.

With the resurgence of bed bugs, *Cimex lectularius* (Hemiptera: Cimicidae), in the western world over a decade ago, a search for effective monitoring and control measures were sought after. See Boase, C. (2001) Bedbugs—Back from the Brink. *Pesticide Outlook*, 12, 159-162; Potter, M. F. (2005) A bed bug state of mind: emerging issues in bed bug management. *Pest Control Technology*, 33, 82-85, 88, 90, 92-93, 96-97; and Cooper, R. (2006) Bed Bugs—Still More Questions Than Answers: A need for Research and Public Awareness. *American Entomologist*, 52, 111-112.

A pest control industry survey conducted in 2005 found that 67.9% of pest control companies were using sticky traps as monitors for bed bug infestations; however, soon pitfall interceptor trap designs were found to be more effective than even visual inspections at detecting low level infestations of bed bugs. See Wang, C., Gibb, T. & Bennett, G. W. (2009) Evaluation of Two Least Toxic Integrated Pest Management Programs for Managing Bed Bugs (Heteroptera: Cimicidae) With Discussion of a Bed Bug Intercepting Device. *Journal of Medical Entomology*, 46, 566-571.

The effectiveness of sticky traps as monitors has been stated to be marginally effective but there have not been any published studies to date on the success or failure of sticky traps as monitors of bed bugs. See Potter, M. F. (2011) The History of Bed Bug Management—With Lessons from the Past. *American Entomologist*, 57, 14-25.

Despite the success observed from using pitfall interceptor trap designs for bed bug infestation monitoring, these traps are only designed for catching a single pest encountered in the urban environment. Sticky traps, however, are proven effective monitors of cockroaches and spiders. See Kardatzke, J. T., Rhoderick, I. E. & Nelson, J. H. (1981) How roach surveillance saves time, material, and labor. *Pest Control*, 46-48; Vetter, R. S. & Barger, D. K. (2002) An Infestation of 2,055 Brown Recluse Spiders (Araneae: Sicariidae) and No Envenomations in a Kansas Home: Implications for Bite Diagnoses in Nonendemic Areas. *Journal of Medical Entomology*, 39, 948-951; Ballard, J. B. & Gold, R. E. (1984) Laboratory and field evaluations of German cockroach (Orthoptera: Blattellidae) traps. *Journal of economic entomology*, 77, 661-665; Barak, A. V., Shinkle, M. & Burkholder, W. E. (1977) Using Attractant Traps to Help Detect and Control Cockroaches. *Pest Control*, 14-20; and Kaakeh, W. & Benneti, G. W. (1997) Evaluation of Trapping and Vacuuming Compared with Low-Impact Insecticide Tactics for Managing German Cockroaches in Residences. *Journal of Economic Entomology*, 90, 976-982.

Sticky traps have also been observed to catch ants, small flies, mice, beetles, and millipedes. See Wang, C. & Bennett, G. W. (2006) Comparison of Cockroach Traps and Attractants for Monitoring German Cockroaches (Dictyoptera: Blattellidae). *Environmental Entomology*, 35, 765-770.

Small modifications to German cockroach sticky traps that take into account behavioral factors have been found to increase the catch rate of those sticky traps. See Phillips, A. D. G. & Wyatt, T. D. (1992) Beyond origami: using behavioural observations as a strategy to improve trap design. *Entomol. Exp. Appl.*, 62, 67-74.

Small design changes to a German cockroach sticky trap that incorporate ideas concerning bed bug behavior may not only be found to be effective monitors of bed bugs but other crawling arthropod pests.

However, traditional sticky traps have problems in trapping bed bugs. Thus, the need exists for solutions to the above problems with the prior art.

SUMMARY OF THE INVENTION

A primary objective of the present invention is to provide traps, devices, systems, compositions, and methods for trapping bed bugs, and similar insects with sticky traps having a perimeter surface around the sticky surface, where the perimeter surface can be abraded to a selected texture having both smoothness and roughness qualities.

A second objective of the present invention is to provide traps, devices, systems, compositions, and methods for trapping bed bugs, and similar insects with sticky traps having a surrounding smooth surface which does not allow for the bed bug to have leverage in which to pull themselves from the sticky surface.

A third objective of the present invention is to provide traps, devices, systems, compositions, and methods for trapping bed bugs, and similar insects with sticky traps having a surrounding surface that does not inhibit bed bugs from traveling thereon.

A preferred embodiment of a bed bug trap, device, and/or composition can include the combination of an adhesive surface, and a textured smooth surface surrounding the adhesive section, the relatively smooth section having a roughness texture for attracting bed bugs and being smooth enough to prevent escape by the bed bugs being trapped on the adhesive section.

A method of trapping bed bugs in a sticky trap can include the steps of providing a sticky surface on a substrate, providing a smooth surface surrounding the sticky surface on the substrate, and abrading the smooth surface into a textured surface, so that bed bugs are not able to use the surfaces to pull themselves from the sticky surface, and the textured surface is not so smooth as to cause the bed bugs to avoid the textured surface.

The abrading step can include increasing proportions of bed bugs caught on the sticky surface by decreasing roughness of the textured surface.

Another method for making sticky traps for bed bugs, can include the steps of providing a substrate with a smooth surface, providing a sticky portion on the smooth surface so that the sticky portion is surrounded by a perimeter of the smooth surface, and abrading the perimeter surface into a textured surface so that bed bugs are not able to use the perimeter smooth surface to pull themselves from being trapped on the sticky surface, and the textured surface is not so smooth as to cause the bed bugs to avoid the textured surface.

The traps, devices, compositions and methods can include smooth bands about the sticky surfaces having selected bandwidths and roughness averages to increase the numbers of bed bugs that can be trapped on the sticky surfaces.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Initially, the sticky trap can be formed by starting with a smooth surface substrate, which is followed by adding a sticky substance adhesive to a central portion, and modifying the surrounding surface into a textured surface.

Figure 1:
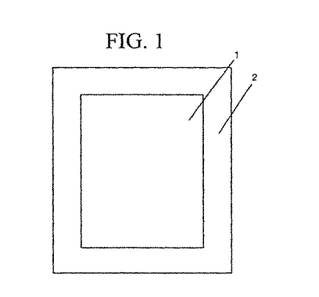
FIG. 1 is an upper view of the novel bed bug sticky trap with selected textured surface perimeter.

FIG. 1 is an upper view of the novel bed bug sticky trap having a generally central sticky portion 1 formed from an adhesive such as glue surrounding by a selected textured surface perimeter 2. The selected textured surface perimeter can be formed by applying an abrasive treatment such as sand paper to a smooth surface substrate.

Surface Substrates Around Sticky Adhesive Surface

The smooth surface can be selected from any acetate paper. Acetate Paper is a transparent material that is made by reacting cellulose with acetic acid in the presence of sulfuric acid, where various manufacturers form it into sheets for use.

The smooth surface can be selected from any plastic material, such as but not limited to plastic laminated paper, polyurethane, polyacrylic, and Plexiglas should all work well when modifying present sticky traps. Most hard and smooth plastics should be able to be textured and potentially work with the invention. Smooth surfaces around the perimeter of glue in a sticky trap can be abraded to the correct texture.

Abrasive Treatment

Abrasive treatments can be accomplished by sand paper, and the like. European grade sand paper comes in different grades, where the "P" designator corresponds to a different grit number.

Figure 2:
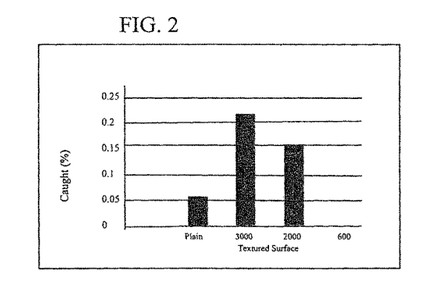
FIG. 2 is a bar graph showing the comparison of male bed bug capture rates for various specific textured surfaces surrounding an adhesive sticky surface.

FIG. 2 is a bar graph showing the comparison of male bed bug capture rates for various specific textured surfaces surrounding an adhesive sticky surface. Each textured selected acetate surface was sanded with P 600 grit sandpaper, P 2000 grit sandpaper, P 3000 grit sandpaper, or not sanded. The lower the sandpaper grit value the coarser the sandpaper being used.

Figure 3:
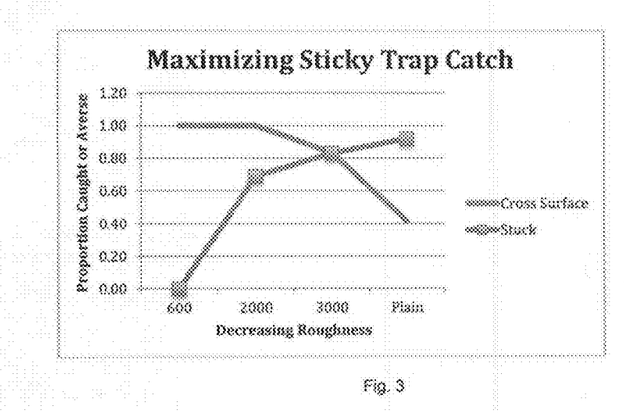
FIG. 3 is a graph of male beds caught on the trap verses roughness of the textured surface.

FIG. 3 is a graph of male beds caught on the trap verses roughness of the textured surface. Referring to FIG. 3, the "event" on the y-axis represents bed bugs successfully crossing onto the sanded acetate surface (solid line) or whether they were successfully stuck on the sticky adhesive surface (line with blocks). The x-axis represents decreasing roughness from left to right. Plain acetate paper that was not sanded is the smoothest surface tested. From the figure above, one would use acetate paper sanded with a P3000 grit sandpaper to maximize trap catch of bed The inventors have examined the differences in the trapping ability of placing plain acetate paper, P600, P1500, P2000, and P3000 sanded acetate paper around a sticky adhesive surface over the traditional card stock surface used in sticky traps. The surfaces were ranked from roughest to smoothest are: card stock, P600, P1500, P2000, P3000, and plain acetate paper. Preliminary trials found P600 and P1500 sanded acetate paper to work about the same so we ceased testing it.

Our present experiments with bed bug $1^{st}$ instar nymphs have shown that there are an increasing proportion of bed bugs caught as the surface surrounding the sticky adhesive becomes smoother. In the test on bed bug adult males, there was not a clear linear trend; P3000 sanded acetate paper surfaces caught a higher proportion of adult male bed bugs.

Smooth Border Width Perimeter Around Sticky Adhesive

The smooth surface around the sticky adhesive should be at least approximately 7 mm wide. This width is equivalent to around the maximum length of an adult bed bug. At approximately 7 mm, the bed bug should be unable to gain hold of any rough surfaces around the smooth surface perimeter.

Aversion Behavior to Smooth Surfaces

Bed bugs, especially first instar nymphs, show aversion to smooth surfaces. Bed bugs are less likely to cross onto a surface the smoother it is. Despite having the ability to walk across a horizontal smooth surface, bed bugs will not cross a smooth surface and will try to find another way around. We noticed that $1^{st}$ instar nymph bed bugs that were placed on a P600 sanded acetate paper circle that is surrounded by plain acetate paper would rarely leave the P600 circle. The $1^{st}$ instar nymphs would follow the perimeter of the rough circle. Similar behavior is also seen in the adults but is less pronounced. Some aversion to P2000 and P3000 sanded acetate surfaces was found in $1^{st}$ instar nymphs but it was much less significant.

Maximizing Bed Bug Trap Catch Using Specific Surface Roughness Around a Adhesive Surface From the experimental results, there are several conclusions:
1. The proportion of bed bugs caught on a sticky adhesive surface increases as the roughness of the surface surrounding the sticky adhesive surface decreases.
2. The proportion of bed bugs that cross onto the surface surrounding the sticky adhesive surfaces decreases as the roughness of the surface surrounding the sticky adhesive surface decreases.

From the results of our experiment on the proportion of bed bug $1^{st}$ instars caught and averse on surfaces of different roughness, we can calculate the best surface roughness to use around a sticky adhesive surface to maximize catch rate. The invention allows for having a smooth surface that does not allow for enough traction for the bugs to remove themselves from the sticky portion.

We examined the effects of modifying the surface roughness surrounding a non-setting adhesive of a cockroach sticky trap on trapping bed bugs. An experiment on the behavior of bed bugs interacting with these changed roughness characteristics was also conducted to examine how bed bugs would encounter these modified traps.

Materials and Methods

Bed Bugs

A bed bug strain collected over 40 years ago by Harold Harlan in Ft. Dix New Jersey was used for the experiments.

Adult bed bugs were fed one week prior to the experiments. First instar nymphs were unfed and had hatched within a week prior to being used in the experiments.

Figure 4:
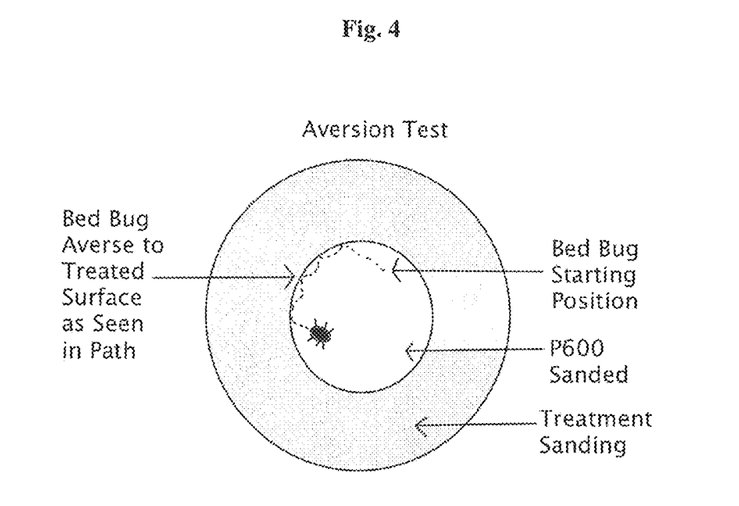
FIG. 4 shows an arena diagram of contact assay with a 5.5 cm diameter sanded acetate paper at the center of a 9 cm circle of different sanded $R_a$ value treatments.

Surface Contact Assay (FIG. 4)

Test surfaces were prepared by sanding a 5.5 cm diameter circle with P600 grit sandpaper on a 9 cm diameter circle of clear acetate paper (Grafix, Maple Heights, Ohio). The remaining 9 cm diameter circle that was not sanded was then sanded with P600 grit sand paper, P2000 grit sand paper, P3000 grit sand paper, or left plain. See FIG. 4. These treated surfaces were then placed onto a piece of printing paper resting in a 55 cm×55 cm square Plexiglas arena (Plaskolite, Columbus, Ohio) with clear acetate paper walls.

The arenas were housed in a windowless room with the lights turned off. Video cameras with embedded infrared cut filters were mounted above each arena tested (Model: FI8910W, Foscam Digital Technologies, Houston, Tex.). Infra red lights were positioned in the room to provide enough infra red light for the video cameras to capture detailed bed bug movements. Individual bed bugs were placed onto 5.5 cm circles and contained using an inverted 4.5 cm diameter polypropylene portion container (Dart, Mason, Mich.).

After a 15 min acclimation phase, the cups were removed so that the bed bugs could explore the arena. The video cameras recorded bed bug movement for 30 mins but the experiment was stopped if at any point the bed bugs left the 9 cm circle. The time it took each bed bug to leave the 9 cm circle was recorded in addition to the number of times the bed bugs touched or passed through the perimeter of the 5.5 cm circle. The experiment was replicated 10 times for each surface treatment (P600 grit, P2000 grit, P3000 grit, or plain) on each bed bug life stage tested (male, female, or first instar nymph).

An extended experiment was conducted to examine how long $1^{st}$ instar nymphs would stay on the 9 cm arena beyond the initial constrained 30 min contact assay. Only plain acetate paper was tested. The experiment was performed in the same manner as the initial contact assay but the arenas were placed in the open on a lab bench subjected to the presence of lab workers and a natural light cycle. Bed bugs were checked once daily for their absence or presence on the 9 cm circular arena and were lightly blown on to check that they were still alive. The experiment was stopped once all bed bugs had left the arena or all bed bugs had died. A total of 24 $1^{st}$ instar nymphs were tested.

Figure 5:
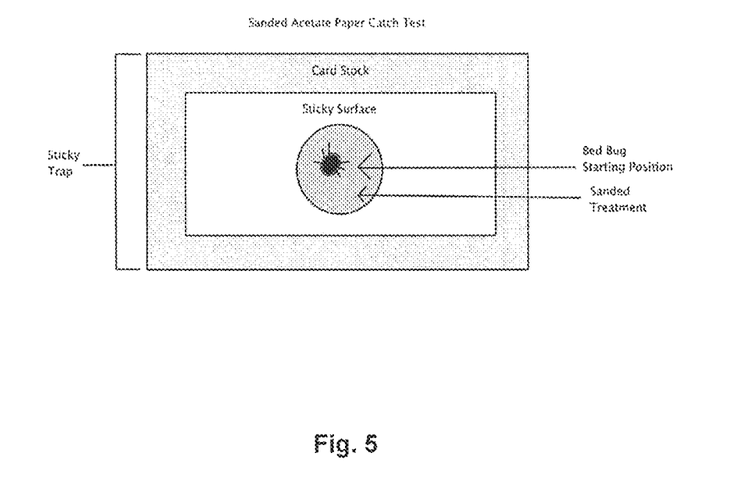
FIG. 5 shows an arena diagram of sticky trap assay with a 3.5 cm diameter sanded acetate circle embedded in a Victor cockroach sticky trap.

Uniform Sticky Trap Assays (FIG. 5)

Acetate paper (Grafix, Maple Heights, Ohio) or a plain index card (Office Max, Naperville, Ill.) were glued with Loctite super glue (Henkel Corporation, Rocky Hill, Conn.) on top of the release paper covering the sticky surface of a Victor roach glue trap and monitor (Woodstream Corporation, Lititz, Pa.). Two evenly spaced 3.7 cm circles were drawn onto the acetate paper or a note card. Acetate circles were sanded with P600 grit sandpaper, P2000 grit sandpaper, P3000 grit sandpaper, or left plain.

Acetate paper surfaces were cleaned with water and a paper towel after being sanded. Note cards were left plain. Two metal punches 3.7 cm in diameter were positioned on both of the circles drawn on top of the acetate paper or index card. A hammer was used against the metal punches to punch two holes in the cockroach trap and the acetate paper or index card. The circles were not removed from the surrounding sticky trap but were pushed down so that the circular acetate paper or the index card piece were at the same level as the sticky adhesive surface underneath the release paper of the cockroach trap. The surrounding release paper and excess acetate paper or index card was removed from the sticky trap. The finished assay can be viewed in FIG. 5.

Assays were placed in a dark windowless room illuminated by one red light bulb. Male or $1^{st}$ instar nymph bed bugs were each placed into a 4.5 cm polypropylene portion container (Dart, Mason, Mich.). The containers were each inverted and placed over acetate or index card circle. After 15 mins of acclimation, the containers were removed. An observer monitored the bed bugs over the course of the experiment and recorded whether or not the bed bugs were caught after 15 mins. Traps that did not catch bed bugs were cleaned and reused up to four times. Twelve replications for each treatment combination were performed.

Added Treatment Band Sticky Trap Assay

The following assay was created in the same manner as the uniform sticky assay except that instead of having a uniform sanded 3.7 cm diameter circle, a 0.7 cm or 0.3 cm band of varying sanded surfaces was created around a P600 grit sanded center. The band was sanded with either P2000 grit sandpaper, P3000 grit sandpaper, or left plain.

Four 1st instar bed bugs were put in glass vials for each treatment. The glass vials were inverted on top of the center of each circle treatment and left there for 15 mins. After 15 mins, the vials were removed and the experiment started. An observer recorded the number of bed bugs caught after 15 mins. Arenas were cleaned and reused up to four times if bed bugs were not caught. The experiment was replicated twelve times for each treatment combination.

Surface Topography Measurements

A Contour GT-I optical profilometer (Bruker Corporation, Billerica, Mass.) analyzed the surface topography of various surfaces used in all experiments conducted. The surfaces of P600 grit, P2000 grit, and P3000 grit sanded acetate paper were analyzed. Plain acetate paper, a plain index card, and the card stock from a Victor roach glue trap and monitor were also analyzed. All of the acetate paper surfaces were cleaned with water and paper towels before being tested. The magnification setting and field of view of the optical profilometer were set at 20× and 1× respectively. This led to a measurement area of 315.2 µm×236.4 µm. Automated VXI universal imaging with a green light illumination were used for all measurements. Four different samples for each surface were analyzed and the roughness average ($R_a$) of each sample was recorded. The $R_a$ is the arithmetic mean of the absolute values of the distances between the surface profile and a mean line. The mean line is created so that the area between the surface profile above the mean line is equal to the area bellow. See Bhushan, B. (2002) *Introduction to Tribology*. John Wiley & Sons, Inc, New York.

Statistical Analysis

For the surface contact assay, the number of contacts a bed bug made with the treatment surface was analyzed using a Poisson regression model. Life stage (Male, female, or $1^{st}$ instar nymph) was set as a categorical predictor and roughness average ($R_a$) as an ordinal categorical predictor. An interaction term between life stage and $R_a$ was also included. Over dispersed data were analyzed using a negative binomial model instead of the Poisson regression model given a significant likelihood ration (LR) test. See Hilbe, J. M. (2011) *Negative Binomial Regression*, 2nd ed. Cambridge University Press, Cambridge.

Analysis of deviance was used to examine the effects of all explanatory variables on the effects of deviance. Tukey adjusted least-squares means comparisons were performed between all explanatory variables.

The binomial responses from the uniform sticky trap assay were analyzed using a generalized linear mixed effects model with a binomial distribution. Life stage (Male and $1^{st}$ instar nymph) and log transformed $R_a$ were set as fixed effect categorical and continuous explanatory variables respectively. An interaction term between life stage and $R_a$ were also fitted if significant effects on deviance were found. Specific traps used were fitted as random effect predictor variables. Odds ratios were calculated for all estimates.

The proportion of $1^{st}$ instar nymphs caught in sticky traps with various surface treatment widths was analyzed using a linear mixed effects model. Both $R_a$ and width were fitted as fixed effects ordinal predictor variables. The specific traps used were set as random effects. An interaction effect between life stage and $R_a$ was also examined. An analysis of deviance was performed to examine the effects of the fixed effects on deviance and Tukey adjusted least-squares means comparisons were made between the fixed effects.

Results

Using an optical profilometer, the mean and SE of the $R_a$ values for each of the six surfaces tested were successfully calculated. The lowest $R_a$ value was observed on plain acetate paper (19 nm±0.7) and was followed by P3000 grit sanded acetate paper (114 nm±3.9), P2000 grit sanded acetate paper (266 nm±13.6), and P600 grit acetate paper (891 nm±76.0). The highest $R_a$ values were found on the Victor cockroach trap cardstock (25906.8 nm±980.3) and the index card (25672.3 nm±1955.7). A statistically significant difference in $R_a$ was not found between the Victor cockroach trap cardstock and the index card (t=−0.116, df=3.375, P=0.914).

Figure 6:
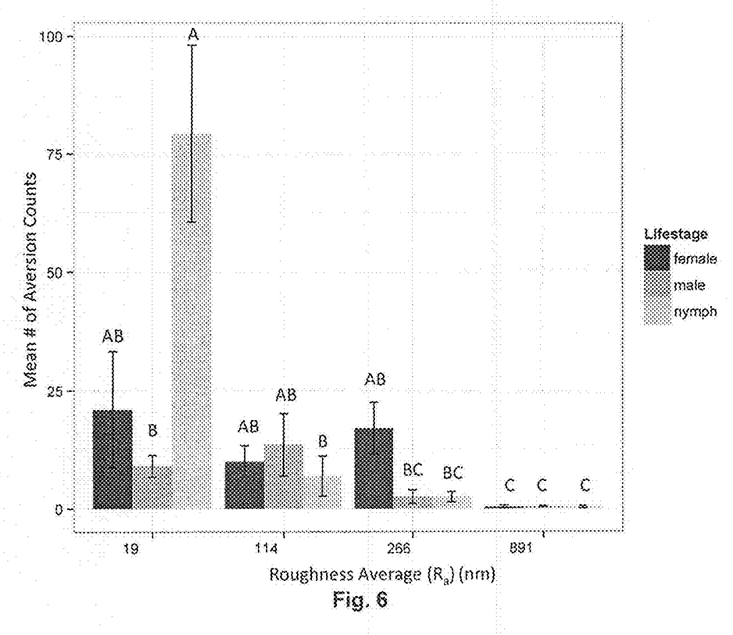
FIG. 6 shows a graph of mean number of times a bed bug contacted surface treatments when placed on a 5.5 cm diameter sanded acetate circle at the center of a 9 cm circle of different sanded $R_a$ values. Treatments containing different letters are statistically significant given a least-squares means Tukey adjusted pairwise comparison test at $\alpha=0.05$.

Bed bugs displayed various levels of aversion contacts between the P600 sanded acetate center and the surrounding surface treatments, FIG. 6. All of the bed bugs eventually left the 9 cm arena except 6 bed bugs on the 19 nm and 2 on the 114 nm $R_a$ surface. A LR test between the Poisson regression and negative binomial model was statistically significant ($X^2$=1588.128, P<0.001). Given these results, we concluded that the data was over dispersed and used the negative binomial model for all further analyses. An analysis of deviance found that life stage (LR $X^2$=11.238, df=2, P=0.004), Ra (LR $X^2$=24.730, df=3, P<0.001), and the interaction between life stage and $R_a$ (LR $X^2$=21.986, df=6, P=0.001) all had significant effects on deviance. Tukey adjusted least-square means pairwise comparisons were calculated for all factor combinations and can be viewed in FIG. 6.

First instar nymphs produced the highest number of aversions against 19 nm $R_a$ surfaces out of all treatment combination with a mean of 79.3±18.8 counts (mean±SE). These aversion counts were not statistically significant from female bed bugs on 19 nm $R_a$ surfaces with 21±12.3 counts, 114 nm with 10.0±3.3 counts, or 266 nm with 17.0±5.5 counts (Z=−1.94, P=0.731; Z=3.14, P=0.073; Z=2.35, P=0.443). The 1$^{st}$ instar nymph aversion counts on 19 nm were also not significant from male bed bug aversion counts on 114 nm $R_a$ surfaces that had a mean count of 13.5±6.6 (Z=2.69, P=0.229).

Observations of the number of aversion counts of 1$^{st}$ instar nymphs on other surfaces saw decreases in the number of counts as $R_a$ values increased. A mean of 6.8±4.3 counts were observed on 114 nm $R_a$ surfaces, 2.5±1.1 counts on 266 nm, and 0.3±0.3 counts on 891 nm. Statistically significant differences were not found between 114 nm and 266 nm $R_a$ surfaces (Z=1.57, P=0.919) or 266 nm and 891 nm Ra surfaces (Z=2.50±P=0.337). Statistically significant aversion counts were found between 114 nm and 891 nm $R_a$ surfaces (Z=3.82, P=0.008).

Figure 7:
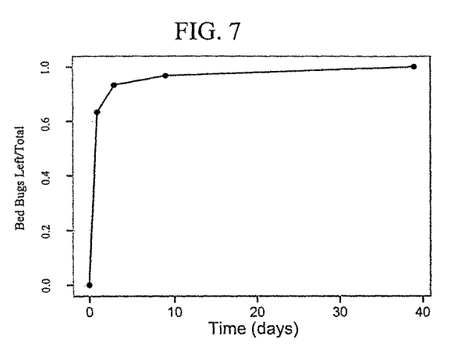
FIG. 7 shows a graph of Time it took $1^{st}$ instar bed bugs, *Cimex lectularius*, to leave a circular arena consisting of a 5.5 cm sanded acetate circle ($R_a$: 891) at the center of a 9 cm plain acetate circle ($R_a$: 19 nm).

The extended contact assay lasted much longer than the constrained 30 mins of the initial experiment. Of the 24 1$^{st}$ instar nymphs tested, 79% of individuals had left the 9 cm arena after 24 hrs, FIG. 7. A majority of the 5 remaining bed bugs left the arena over the course of 9 days but one bed bug stayed in the arena until it died on the 39$^{th}$ day.

Figure 8:
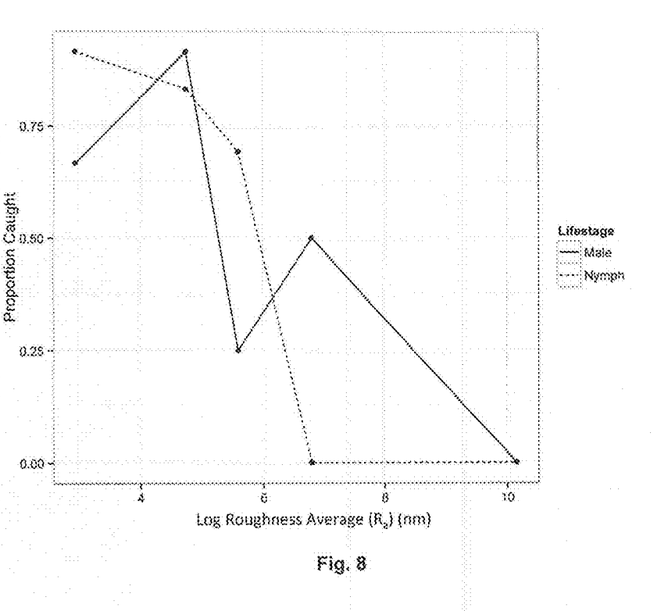
FIG. 8 shows a graph of the proportion of bed bugs, *Cimex lectularius*, caught when placed on a 3.5 cm diameter sanded acetate paper circle with different $R_a$ values and embedded in a Victor cockroach glue trap. Treatments with different letters are statistically significant given least squares means Tukey adjusted contrast comparisons at $\alpha=0.05$.

The uniform 19 nm $R_a$ surface caught the highest proportion of 1$^{st}$ instar nymphs (0.92) in the Victor cockroach sticky adhesive while the 25672 nm $R_a$ and 891 nm $R_a$ surfaces caught none, FIG. 8. The results from the male assay were somewhat similar but did not display as clear of a linear trend. The uniform 114 nm $R_a$ surface caught the highest proportion of male bed bugs (0.83) and the 25672 nm $R_a$ surface caught none. The two generalized linear mixed effect models, one with an life stage×log $R_a$ interaction term (AIC=144.9, BIC=158.97, log Lik=−67.5) and one without (AIC=143.4, BIC=154.6, log Lik=−67.7), were compared using a goodness of fit test. The goodness of fit test did not find a statistically significant difference between the two models (X$^2$=0.451, df=1, P=0.502).

Examination of the analysis of deviance of the interaction model between life stage (Male or 1$^{st}$ instar nymph) and the log $R_a$ found that that life stage and the interaction term did not have a statistically significant effect on deviance (X$^2$=0.261, df=1, P=0.609; X$^2$=0.445, df=1, P=0.505); however, a significant effect was found on the fitted log $R_a$ (X$^2$=5.495, df=1, P=0.019). The additive model without an interaction term was used for the remaining analysis. The generalized linear mixed effect model found that every one level of increase in log $R_a$ resulted in a 58% reduction in the proportion of bed bugs caught given that life stage was kept constant (Odds ratio 0.417, 95% CI 0.217-0.803). This negative trend observed in the proportion of bed bugs caught as the log $R_a$ increased can be viewed in FIG. 8.

Figure 9A:
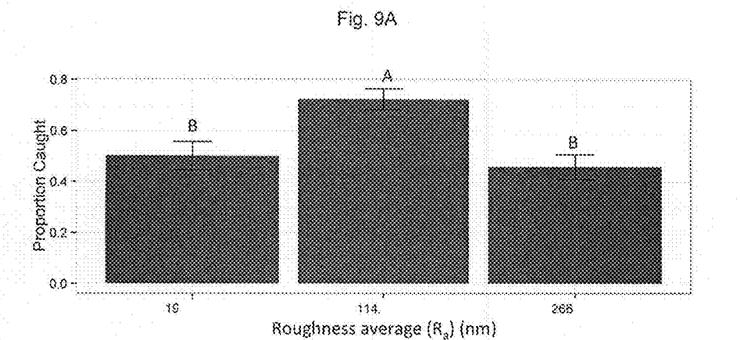
FIGS. 9A and 9B show bar graphs of the proportion of bed bugs, *Cimex lectularius*, caught when placed on a 3.5 cm diameter sanded acetate paper circle ($R_a$: 891 nm) that was embedded in a Victor cockroach glue trap and containing a 0.7 or 0.3 cm band of various treatment $R_a$ values. Treatments with different letters are statistically significant given least squares means Tukey adjusted contrast comparisons at $\alpha=0.05$.
Figure 9B:
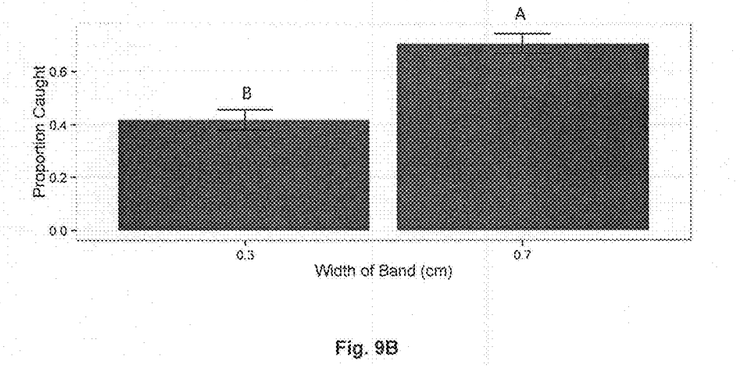

With the creation of a 0.7 cm or 0.3 cm sanded treatment band around a 891 nm $R_a$ surface, the differences between surface treatments and band widths were observed, FIG. 9A and FIG. 9B. A linear mixed effect model without an interaction term was used for the final analysis because a lack of a significant interaction between width and surface $R_a$ was observed in an analysis of deviance (X$^2$=1.622, df=2, P=0.444).

An analysis of deviance on the fitted additive model found surface $R_a$ and width to have a statistically significant effect on deviance (X$^2$=23.418, df=2, P<0.001; X$^2$=36.172, df=1, P<0.001). The highest proportion of 1$^{st}$ instar nymphs were caught on 114 nm $R_a$ surfaces (0.73±0.04) and was statistically significant from both 19 nm (0.50±0.06) and 266 nm (0.46±0.05) $R_a$ surfaces (t=−3.793, df=20, P=0.003; t=4.499, df=20, P=0.001). Contrasts between 0.3 cm and 0.7 cm widths were also found to be statistically significant (t=−6.014, df=20, P<0.001).

CONCLUSION

Bed bugs were caught on non-setting adhesives depending on the roughness of the surrounding area. Index cards were used to represent the surfaces typically surrounding the adhesives of a commercial cockroach trap. The roughness values of these index cards were found to be statistically insignificant from the roughness of the card stock used in Victor cockroach traps. Male and 1$^{st}$ instar nymph bed bugs never became entrapped in non-setting adhesives when index cards were used. It is unlikely that these standard cockroach sticky traps would be successful in trapping bed bugs in the field.

Surfaces with lower roughness values than the index card were able to catch bed bugs successfully. As the roughness value of the surface decreased, increasingly more bed bugs were caught. This trend is likely attributed to bed bugs inability to gain enough grip on the surrounding surfaces to pull themselves out of the adhesive. Bed bugs' reduced ability to grip smoother surfaces has been documented previously While the capability of a trap to physically confine or ensnare an insect is important, behavioral factors can also play a major roll in how successful a trap is at catching a given insect. Huge differences in the catch rate of different stored product beetle species were found in pitfall traps. Much of the variation in catch rate between these species was due to the degree of aversion behavior some of these species had to the top lip of the pitfall trap container. One of the species was so averse to the lip of the pit fall trap that few individuals were caught. See Obeng-Ofori, D. (1993) Obeng-Ofori 1993 The behaviour of 9 stored product beetles at pitfall trap arenas and their capture in millet.pdf. Entomologia *Experimentalis et Applicata*, 66, 161-169.

A similar aversion behavior was also found with bed bugs on increasingly smoother surfaces. This aversion behavior was especially pronounced in 1$^{st}$ instar nymph bed bugs. It is surprising that despite being physically capable of crossing these smooth surfaces, some of these nymphs displayed such strong aversion to smooth surfaces that they stayed confined by a 19 nm rough surface treatment for days and even until death in one case.

Maximizing the trap catch of a modified cockroach sticky trap thus involves two conflicting forces: smoother surfaces trap more bed bugs but smoother surfaces deter more bed bugs from contacting the trap. A similar issue has been described with a modified cockroach trap design where an increasing slope at the entrance of a cockroach trap could both deter the cockroaches but also reduce the number of escapes. See Phillips, A. D. G. & Wyatt, T. D. (1992) Beyond origami: using behavioural observations as a strategy to improve trap design. *Entomol. Exp. Appl.*, 62, 67-74.

In our situation, the banded sticky trap assay with two different surface roughness values may shed some light on a compromise between these two opposing forces. The 114 nm rough surface caught the most number of 1$^{st}$ instar nymphs. The reduced catch seen on 19 nm surfaces is likely due to aversion behavior to the smooth surface while the reduced catch seen on the rougher 266 nm maybe associated with an increased ability of the bed bugs to escape from the adhesive. We are uncertain why there was a greater catch between the 0.7 cm over the 0.3 cm band.

It is clear from our findings that cockroach sticky traps can be modified to catch bed bugs. Sticky traps are an inexpensive alternative to pitfall interceptor traps currently used for bed bug monitoring. These traps may not only be able to catch bed bugs but also other crawling arthropods of interest. Further investigation is needed on the field efficacy of these modified cockroach sticky traps. In addition to the importance of smooth surface aversion behavior in bed bug sticky trap design, the aversion behavior displayed by bed bugs may have implications on the natural dispersal of bed bugs. Other than insights into the physical limitations of bed bugs climbing ability, little is known about how obstacles or surfaces in the environmental influence bed bug dispersal. Both vertical and horizontal smooth surfaces may limit or even direct movement of bed bugs to certain areas in a heterogeneous environment.

Table 1 shows Optical Roughness Average (Ra) Measurements on Modified Sticky Trap Surfaces.

TABLE 1

Optical Profilometer Roughness Average (Ra) Measurements on Modified Sticky Trap Surfaces

| Surface | N | Mean Ra (nm) | Standard Deviation |
|---|---|---|---|
| Plain Acetate Film | 4 | 19.26 | 1.39 |
| P3000 Sanded Acetate Film | 4 | 114.17 | 7.73 |
| P2000 Sanded Acetate Film | 4 | 266.09 | 27.27 |
| P600 Sanded Acetate Film | 4 | 891.10 | 151.96 |
| Note Card | 4 | 25672.25 | 3911.39 |
| Stick Trap Card | 4 | 25906.75 | 980.29 |

Surface topography of various test surfaces were measured using a Bruker optical profilometer. Roughness Averages (Ra) were calculated for all of the surfaces. Ra is the average of a set of readings on a surface examining the peaks and valleys present for the given surface.

From Table 1, one can see that an untreated surface has the lowest roughness value while abrasion treatments increase the roughness value as their grit values decrease. The sticky trap card and note card have the highest roughness values, these represent typical sticky trap surfaces that are used commercially.

Figure 10:
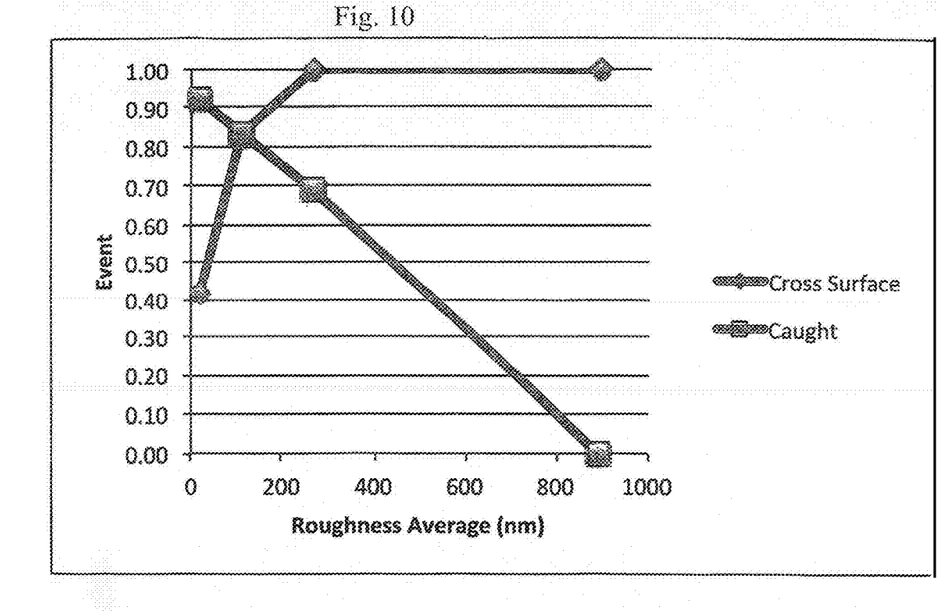
FIG. 10 shows a graph of event verses Roughness Average (nm).

FIG. 10 shows a graph of event verses Roughness Average (nm). This figure is meant to show the inverse relationship of the number of bed bugs caught on a sticky trap and decreased aversion behavior. As roughness increases the number of bed bugs caught decreases but the bed bugs also become less averse to the surface surrounding the non-setting adhesive.

Although the invention references bed bugs as the target of the sticky trap, the invention can be used with other insects, such as but not limited to cockroaches, spiders, ants, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A horizontal bed bug trap consisting of:
a single horizontal central section having an adhesive surface thereon;
a single horizontal textured smooth surface completely surrounding the adhesive surface on the horizontal central section, the textured surface having a perimeter width of at least approximately 7 mm, the textured smooth surface having a roughness texture for attracting bed bugs and being smooth enough to prevent escape by the bed bugs being trapped on the adhesive section, wherein the single horizontal textured smooth surface has a roughness average of approximately 19 nm to approximately 14 nm.

2. The bed bug trap of claim 1, wherein the single textured smooth surface includes acetate paper treated with sandpaper.

3. The bed bug trap of claim 2, wherein the single horizontal textured smooth surface is formed from treating a smooth surface with above P600 sand paper as an abrasive.

4. The bed bug trap of claim 2, wherein the single horizontal textured smooth surface is formed from treating a smooth surface with at least P2000 sand paper as an abrasive.

5. The bed bug trap of claim 2, wherein the single horizontal textured smooth surface is formed from treating a smooth surface with at least P3000 sand paper as an abrasive.

6. The bed bug trap of claim 1, wherein the single textured smooth surface includes plastic material treated with sandpaper.

7. The bed bug trap of claim 6, wherein the plastic material is selected from one of: a plastic laminated paper, polyurethane, polyacrylic, and Plexiglas.

8. The bed bug trap of claim 6, wherein the single horizontal textured smooth surface is formed from treating a smooth surface with above P600 sand paper as an abrasive.

9. The bed bug trap of claim 6, wherein the single horizontal textured smooth surface is formed from treating a smooth surface with at least P2000 sand paper as an abrasive.

10. The bed bug trap of claim 6, wherein the single horizontal textured smooth surface is formed from treating a smooth surface with at least P3000 sand paper as an abrasive.

11. A method for making sticky traps for bed bugs, comprising the steps of:
providing a single horizontal central section having an adhesive surface;
providing a single horizontal smooth surface both completely surrounding the adhesive surface and having a perimeter width of approximately 7 mm;
abrading the single horizontal smooth surface into a textured surface having a roughness average of approximately 19 nm to approximately 114 nm so that bed bugs are not able to use the smooth surface to pull themselves from being trapped on the sticky surface, and the textured surface is not so smooth as to cause the bed bugs to avoid the textured surface.

12. The method of claim 11, wherein the smooth surface includes acetate paper.

13. The method of claim 11, wherein the smooth surface includes a plastic material selected from one of: plastic laminated paper, polyurethane, polyacrylic, and Plexiglas.

14. The method of claim 11, wherein the abrading step includes the step of:
providing greater than P600 grit sandpaper as an abrading agent.

* * * * *